Nov. 9, 1965  A. R. NORDEN  3,217,211
ELECTRICAL CONTROL APPARATUS
Filed Oct. 16, 1961  4 Sheets-Sheet 1
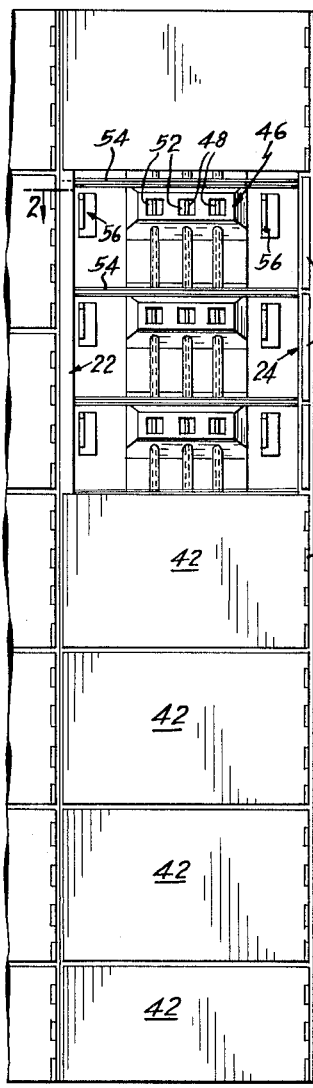
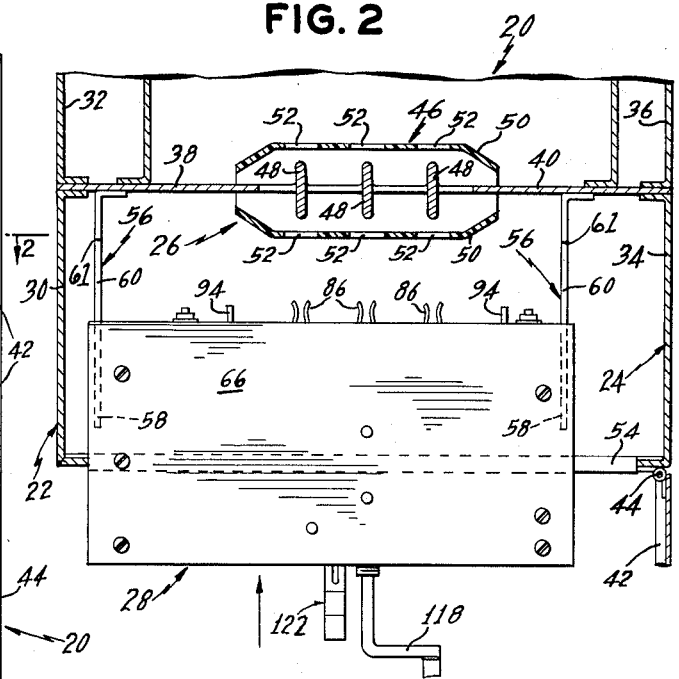
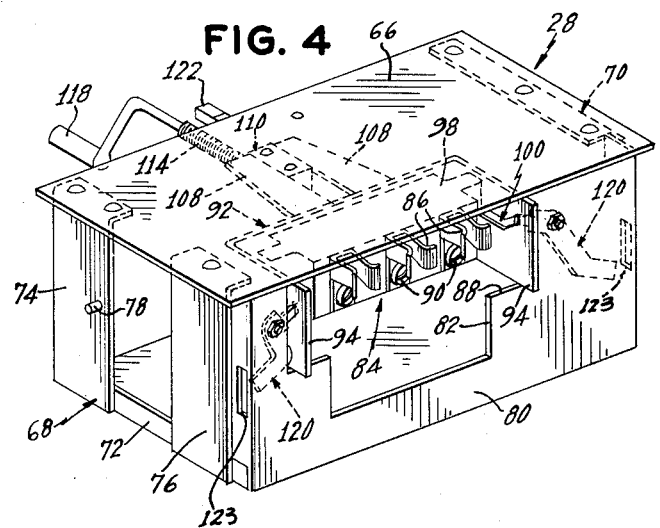
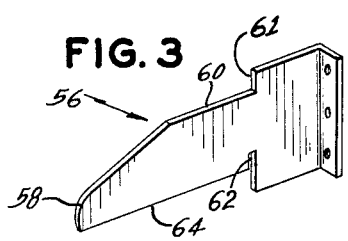
INVENTOR.
ALEXANDER R. NORDEN
BY Richard M. Rabkin
ATTORNEY Nov. 9, 1965  A. R. NORDEN  3,217,211
ELECTRICAL CONTROL APPARATUS
Filed Oct. 16, 1961  4 Sheets-Sheet 2

INVENTOR.
ALEXANDER R. NORDEN
BY
ATTORNEY

Nov. 9, 1965 A. R. NORDEN 3,217,211
ELECTRICAL CONTROL APPARATUS
Filed Oct. 16, 1961 4 Sheets-Sheet 3

INVENTOR.
ALEXANDER R. NORDEN
BY
ATTORNEY

Nov. 9, 1965    A. R. NORDEN    3,217,211

ELECTRICAL CONTROL APPARATUS

Filed Oct. 16, 1961    4 Sheets-Sheet 4

INVENTOR.
ALEXANDER R. NORDEN
BY *Richard M. Rabkin*

ATTORNEY

United States Patent Office 3,217,211
Patented Nov. 9, 1965

3,217,211
ELECTRICAL CONTROL APPARATUS
Alexander R. Norden, New York, N.Y., assignor to Federal Pacific Electric Company, a corporation of Delaware
Filed Oct. 16, 1961, Ser. No. 145,257
10 Claims. (Cl. 317—103)

This invention relates to electrical control apparatus and more particularly to apparatus having removable, readily replaceable control units for use in the distribution of electrical power to branch circuits and to connected loads.

Well-known apparatus of this class includes a free-standing enclosure containing a bus system. The bus system is connected to a major source of electrical power. A plurality of control units including motor starters, circuit breakers and the like, mounted in separable housings, are inserted into the enclosure and connected to the bus system. The panelboard structure provides wiring channels or gutters for the secondary wiring between the inserted control apparatus and the connected loads. Individual panelboards comprise a plurality of the aforementioned enclosures grouped together and mechanically and electrically interconnected to form a control or distribution center.

Usually, a plurality of independent devices of various sizes are to be mounted or "stacked" vertically in each enclosure. The control devices are first mounted in the separable housings which isolate the electrical equipment in the unit from others in the same enclosure. Each separable unit makes plug-in connection to the bus system. Panelboard enclosures are usually equipped with hinged doors which cover the openings in the enclosure through which the control units are accessible. The doors are "dead-front" and isolate the operating personnel from the switchgear and bus system enclosed in the panelboard. The operating controls for the device may be mounted on the door or the door may be provided with an opening through which the controls are accessible.

It is desirable, from time to time, to test the operation of the enclosure-mounted devices which may include motor starters, circuit breakers, and the like, while the individual device is disconnected from the bus but is still in the enclosure and to perform the tests without disturbing the other units in the enclosure. In previously available panelboards the compartment door could be closed only when the unit was fully inserted in the enclosure in its operative position and connected to the bus. To test the unit in the enclosure while disconnected or unplugged from the bus, it was necessary to move the control unit from its fully inserted position to an intermediate position to thereby disconnect the unit from the bus structure. In the intermediate or test position the control unit protruded from the enclosure and prevented the door from closing. Therefore, it is an object of this invention to provide a panelboard and associated control units which overcome the aforenoted difficulties.

It is a further object of this invention to provide a control unit having a disconnecting means interposed between the electrical device in the unit and the associated panelboard whereby the device mounted in the unit may be selectively connected to the bus structure without changing the position of the unit relative to the enclosure and bus structure.

It is yet another object of this invention to provide a separable control unit having means for preventing insertion of the unit into the associated panelboard with the disconnecting means in the "on" position.

It is still another object of this invention to provide a control unit with remote indicating means for indicating whether the unit is locked to the enclosure and the disposition of the associated electrical disconnect means.

The foregoing objects are achieved in an illustrative embodiment of the invention described in detail below and shown in the accompanying drawings. This embodiment includes a panelboard structure comprising an enclosure having opposed sidewalls which define openings for the reception of separable control units. A bus structure is provided in the enclosure containing a plurality of bus bars which may be connected to a source of electrical power. A control unit is provided which mounts the control apparatus to be connected to the bus system. It is adapted to be inserted into the enclosure and slides along bracket members that extend toward the opening defined by the sidewalls. The brackets have portions formed to provide supporting surfaces for the separable unit. The unit is provided with disconnect means for selectively engaging the bus structure when the unit is in its fully inserted position.

For better understanding of the invention, reference is made to the following description taken in conjunction with the accompanying drawings in which:

FIG. 1 is a front elevational view of a panelboard enclosure illustrating one embodiment of the invention, with some parts broken away and other parts omitted in the interests of clarity;

FIG. 2 is a plan view in section of the enclosure of FIG. 1 showing a control unit partially inserted, taken along the line 2—2 of FIG. 1;

FIG. 3 is a perspective view of the enclosure-mounted housing guide bracket;

FIG. 4 is a perspective view of a presently preferred embodiment of the separable control unit viewed from the plug-in end of the unit;

Figure 5:
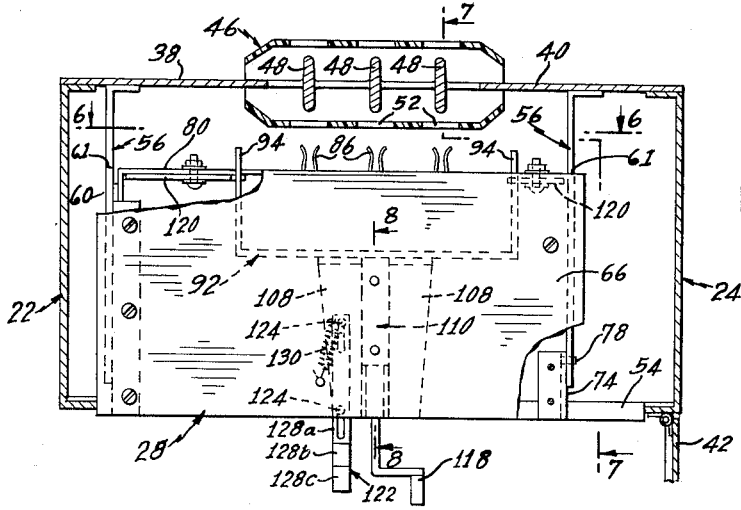
FIG. 5 is a fragmentary plan view, similar to FIG. 2, of the panelboard enclosure showing the control unit fully inserted but unlocked and unplugged.

Referring to the drawings, the panelboard structure includes an enclosure 20 having opposed sidewalls 22, 24 and an intermediate wall 26 spanning the sidewalls. The sidewalls define an opening for receiving the separable control unit 28 and are built up from channel members 30, 32, 34, 36, respectively. Each channel member has opposed flange portions. The channel members 30, 32 forming sidewall 22 are secured together by their adjacent flanges with panel member 38, a portion of the intermediate wall 26, interposed. Sidewall 24 is similarly constructed with panel member 40 interposed between the flanges of channels 34, 36. The compartment doors 42 (FIG. 1) are hinged at 44 from the free flange of channel member and abut and are secured to the flange portion of the opposing channel 30 in the closed position.

The intermediate or back wall 26 incorporates a bus structure 46 having a plurality of vertical bus bars 48 which are electrically insulated from one another and from the housing by means of formed insulators 50. The insulators 50 are joined to each other and to the panel members 38, 40 and secure the bars 48 in position. The insulators 50 are provided with openings 52 through which the bus bars 48 are accessible. Bus structure 46 is shown and described in greater detail in my application Serial No. 145,261 filed concurrently herewith, now Patent No. 3,113,820, which is assigned to the same assignee as the present invention.

Narrow channels 54 span the opening of the switchgear enclosure 20 defined by the sidewalls 22, 24 and support the control unit 28 during a part of the insertion operation. Additionally, they provide an abutting surface for the doors 42 of the compartments as well as adding structural rigidity. The compartment size may be varied by removing some of the channels 54 and utilizing larger doors 42 as shown in FIG. 1. The panelboard enclosure may be double-sided with the bus structure 46 accessible from front and rear as suggested by the drawing (FIG. 2) or single-sided providing access from the front only. In the illustrative embodiment described below only the front compartment is shown in detail.

The panels 38, 40 which connect the bus structure 46 to the sidewalls 22, 24 of the enclosure 20 also act as supports for the control unit brackets or rails 56. Each rail 56, is adapted to engage the control unit 28, to guide it into its inserted position in the enclosure, and to support it in its final and intermediate positions. Leading rail end 58 is rounded and acts as a guide to bring the unit 28 on to the supporting surface 60 of the rail. The surface 60 terminates in a stop 61. Latch engaging notch 62 is formed in the under side 64 of the rail. Opposed rails 56 are mounted on opposite sides of the bus structure 46 and are spaced apart a distance slightly greater than the width of the control unit 28. The rails are spaced vertically, according to the number and position of units 28 to be installed in the enclosure 20. The rails 56 may be individually formed, as shown, or may be part of continuous members secured to the panels 38, 40.

The separable control unit 28 has a top wall 66 which extends beyond the sides 68, 70 for cooperation with the rails 56. The bottom wall 72 of the unit 28 is not as wide as the top 66 thereby providing clearance between the sideplates 68, 70 and the rails 56. Right sideplate 68 is made up of two parts 74, 76 which are spaced apart to provide a passageway for the secondary wiring (not shown). Pin 78, whose function will be explained later, protrudes from sideplate segment 74. The rear wall 80 of the unit 28 has a stepped opening 82 therein.

The separable control unit 28 contains a mechanism to latch the unit in its fully inserted position, and means to make and break the main or power circuit of the control unit; and this mechanism establishes the definite operational sequence that insures locking of the unit in place before the power circuit is made during insertion of the control unit, and delays the unlocking until after the main circuit is interrupted.

For the purpose of controlling the making and breaking of the power circuit, a plug-in element 84 is provided which is movable between retracted and projected positions in relation to the housing of the control unit. Plug-in element 84, that carries contact stabs 86 for selective engagement with the bus bars 48, passes through the upper portion 88 of the opening 82. The lower portion of the opening provides a passageway for wires (not shown) from the solderless connectors 90 of the contact stabs 86 to the apparatus (not shown) mounted in the housing unit. The plug-in element 84 includes a U-shaped carrier 92 having a pair of forwardly extending legs 94 and a bight portion 96. Connector mounting block 98 of insulation is mounted on the bight portion 96 and carries the resilient stab contacts 86 secured in position to engage the bus bars 48 when the plug-in element is extended with the control unit 28 locked in the enclosure 20. Each of the legs 94 of the U-shaped carrier has a cam slot 100 formed therein. The slots 100 have straight portions 102 extending parallel to the direction of motion of the carrier and an angularly inclined portion 104 near the end of the leg remote from the bight portion 96.

Figure 8:
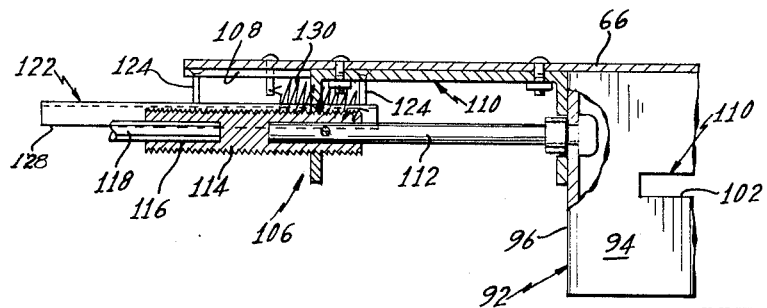
FIG. 8 is a fragmentary side view in partial section, on a greatly enlarged scale, of a portion of the structure in FIG. 5 taken along the line 8—8 therein.
Figure 11:
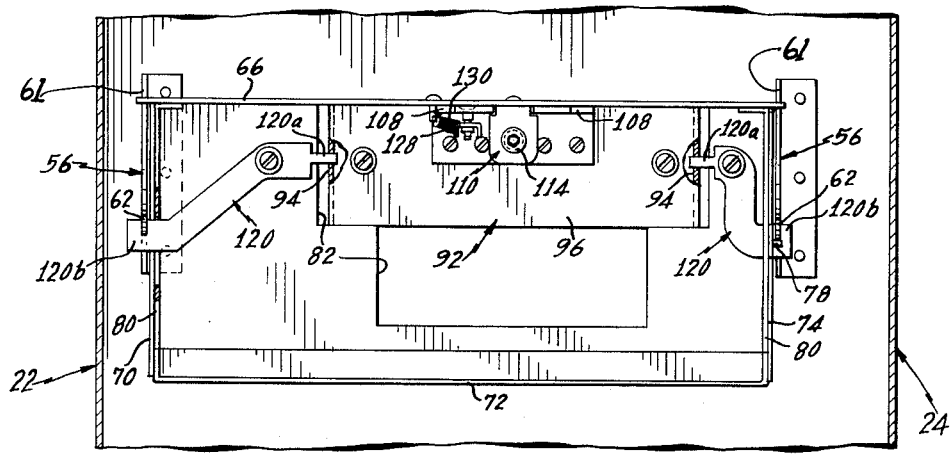
FIG. 11 is a front elevational view of a control unit taken along the line 11—11 of FIG. 10.
Figure 12:
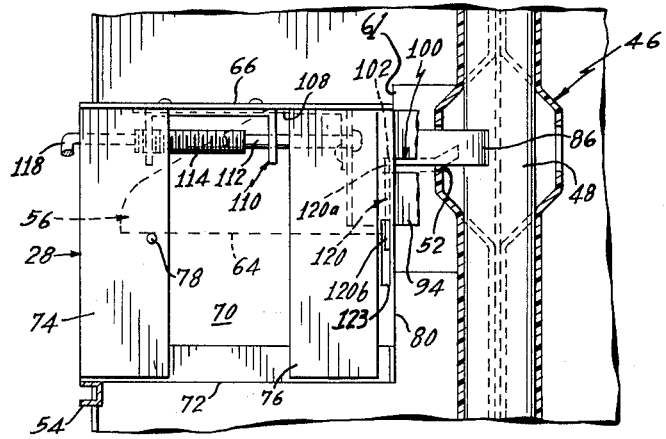
FIG. 12 is a side elevational view of the control unit in FIG. 10 taken along the line 12—12 of FIG. 10.

The plug-in element is reciprocated between its extended and retracted positions by means of the lead screw racking mechanism 106 shown in FIG. 8. The U-shaped carrier 92 has a pair of rearwardly extending plate-like legs 108 (FIG. 4). The mounting bracket 110 of the lead screw mechanism 106 is fixed to top plate 66. Legs 108 straddle bracket 110 and prevent skewing of the plug-in element as it is moved. The plug-in element is also guided during its movements by engagement of legs 94 with the edges 88 of the upper aperture in the rear wall and with the underside of the top wall 66. Racking mechanism 106 causes the plug-in element 98 to engage and disengage the bus bars 48 and includes a rod 112 rotatably secured at one end to the bight portion 96 of the U-shaped carrier 92 and affixed to the lead screw 114 at the other end. Lead screw 114 is threaded into a depending portion of the support bracket 110. The lead screw 114 is provided with a hexagonal socket 116 for receiving the drive handle 118. Rotation of drive handle 118 causes the plug-in element 84 to be advanced or retracted and to thereby engage or disengage the bus bars 48 when in the enclosure.

As indicated above, the control unit 28 includes a mechanism for locking or latching the unit in the enclosure before making the main power circuit. This latching mechanism includes a pair of opposed housing-to-bracket latches or locks 120 which are pivotally mounted on the rear wall 80 of the housing unit 28. These latches move in the plane of the rear wall between "latched" and "unlatched" positions. The latches 120 have reduced-width ends 120a engaging the cam slots 100 in the legs of the carrier 92. The other end 120b of each latch passes through apertures 123 in the housing sidewalls and engage the notches 62 formed in the undersurface 64 of the rails 56 in the latched position.

The position of the plug-in element 84 relative to the housing 28 and to the bus bars 48, whether extended to the connected position or retracted to the disconnected position, is visibly displayed by the remote position indicating means 122. The position indicator 122 is carried by a rearwardly extending leg 108 of plug-in carrier 92. Shouldered pins 124 are secured to leg 108 and pass through slots 126 in the bottom of the channel shaped indicator bar 128. Bar 128 is resiliently urged outwardly and away from the carrier 92 by spring 130. The bar is marked off into three zones by lines 128a, 128b, 128c (FIG. 5). The zones may be variously colored for ease and observation of the position of the indicator bar. The indicator is read by noting the zones of the bar which are visible beyond the edge of the control unit top wall 66. The slots 126 and spring 130 allow the indicator bar to be depressed relative to the unit 28 by the door 42 when the unit is in the enclosure and the compartment door 42 is closed. The carrier 92 is a common actuator or coordinator that interconnects and coordinates the movements of the plug-in element and the latches for sequential operation. The carrier also coordinates the position of the plug-in element, the latches and the indicator bar so that the indicated position is representative of the following positions when the control unit is fully inserted in the enclosure 20:

128a—maximum extension of the bar; unlatched and unplugged;
128b—intermediate extension of the bar; latched but unplugged (test position)

128c—minimum extension of the bar; latched and plugged in.

The separable control unit 28 is inserted into the enclosure 20 through the access opening provided when the door 42 is swung aside. The unit is aligned with the rails 56 with the under-surface of the top 66 of the unit riding on the supporting surface 60 of the rails 56. The leading end 58 of the rail passes between the pin 78 and the top wall 66 of the housing 28. The plug-in element must be retracted prior to the insertion operation because the latches 120 block the path of the rail unless they have been retracted. Retraction of the latches 120 to a non-obstructing position is dependent upon the retraction of the plug-in element 84 to the disconnected position. Therefore, in order to insert the separable control unit 28 in the enclosure 20 one must first operate the racking mechanism 106 to retract latches 120 and plug-in element 84.

Pin 78 on the side 74 of the unit 28 engages the under-surface 64 of the rail 56 while the upper surface of the rail is engaged by the top wall 66 of the unit. The housing unit is thus restrained from rocking during insertion. The forward movement of the housing is terminated when the leading edge of the top 66 encounters the stop 61. After the separable unit 28 has been inserted, but before the plug-in element or disconnect means 84 is actuated, the secondary wiring (not shown) is passed through the passage in the side of the housing between plates 74 and 76 and connected to the usual apparatus contained in the unit. The remote indicator is fully extended in this position exposing all the zones up to line 128a.

Figure 9:
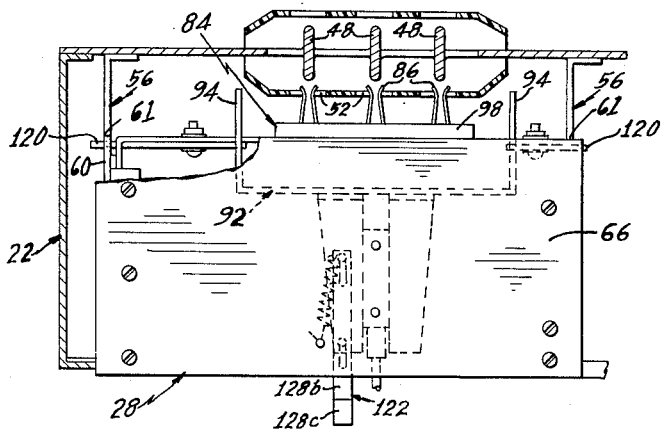
FIG. 9 is a fragmentary plan view of the control unit of FIG. 5 with the unit in the test position, i.e., locked in the enclosure but unplugged.
Figure 10:
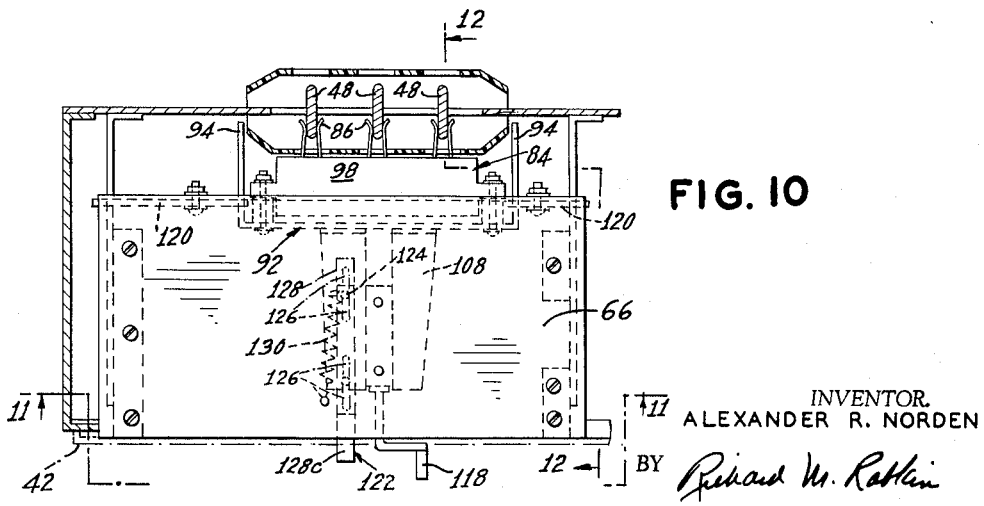
FIG. 10 is a fragmentary plan view of the unit of FIG. 5 with the unit locked in the enclosure and plugged into the bus structure.
Figure 6:
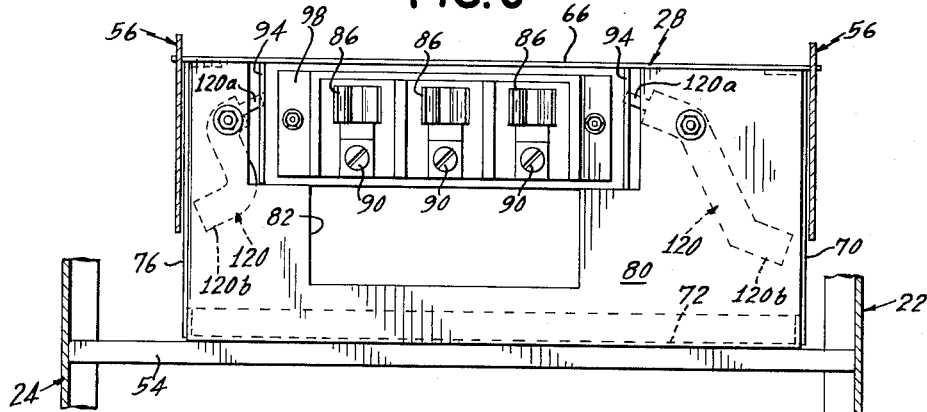
FIG. 6 is a rear view of the control unit, unlocked and unplugged, taken along the line 6—6 of FIG. 5.
Figure 7:
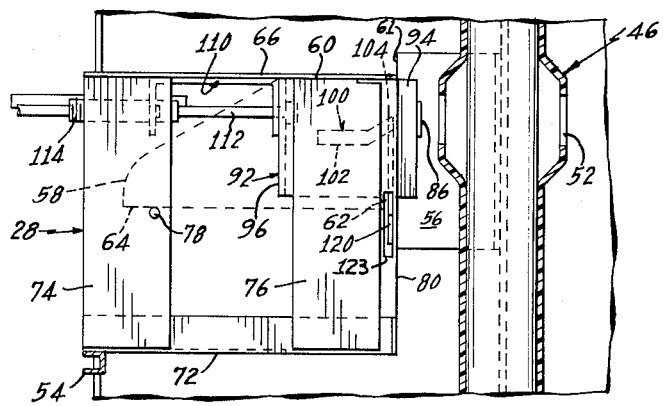
FIG. 7 is a side view of the control unit in FIG. 5 taken along the line 7—7 of FIG. 5.

In order to lock the control unit 28 in the enclosure 20 the locking handle 118 is rotated to operate the lead screw racking mechanism 106 which drives the carrier 92 forward toward the bus bars 48. As the carrier moves forward it carries with it the contact 86 and the cam slots 100, responsive to the position of the contacts 86 by virtue of their coordination, to cause the latches to pivot and the ends 120b of the latches engage the notches 62 in the lower surface 64 of the rail 56. The latches are fully engaged during the initial forward movement of the contacts 86. The position indicator 122 now is in its intermediate position 128b indicating "latched but unplugged." Once the control unit has been latched, continued operation of lead screw racking mechanism 106 causes the plug-in stabs 86 to be passed through the openings 52 in the insulators 50 and to resiliently but firmly engage the bus bars 48, thereby connecting the apparatus contained in the unit to the main power system. Considerable forward thrust is developed for forcing the stabs onto the bus bars. The reaction force is resisted by engagement of latches 120 in slots 62. There is only a limited tendency of latches 120 to bend under this stress because the stress is applied to latches 120 at slots 123 which are so close to rails 56 (see FIG. 9). At this point in the operation, the remote position indicator indicates that the unit is fully inserted latched and plugged in (zone 128c). Handle 118 is removed and the door 42 is closed placing the unit in the completely operative, protected position.

From time to time it is desirable to test the condition of the apparatus contained in the control unit 28, or to disconnect the unit from the bus bars without removing the unit from the enclosure. In heretofore available devices suitable for present purposes it was necessary to physically move the separable housing from one position to another within the enclosure 20 in order to disconnect the apparatus from the bus bars. To obtain the disconnected position in the presently preferred embodiment of the invention it is merely necessary to operate the lead screw racking mechanism 106 in the retracting direction. This is done inserting the handle 118 in the lead screw 114 and then reversing the direction of rotation of the drive handle from the previous engaging direction. This operation of the drive handle 118 causes the plug-in stabs 86 to be withdrawn from the bus bars 48 thereby effectively disconnecting the contained apparatus within the housing from the primary power source. During this operation, even though the plug-in contacts may develop considerable resistance, the unplugging operation is easy because of the reaction developed at latches 120. The rotation of the lead screw 114 is stopped when zone 128b is shown on the remote position indicator 122 which informs the operator that at that point the unit has been disconnected. The unit is still latched to the rails 56, and the indicator portion 128b so indicates. Tests may be performed on the functioning of the apparatus, such as solenoids, relays and the like while in their normal operating orientation while connected to the secondary or control wiring and disconnected from the primary power lines. The entire separable housing unit may be left in the "disconnected" position without interfering with closing of the access door 42. This avoids hazard to the operating personnel. The remote position indicator 122 is resiliently mounted and for this reason does not interfer with the door closing.

While one embodiment of the invention has been shown and described it will be readily apparent to those skilled in the art that various changes and modifications may be made therein without departing from the spirit or scope of the invention.

What is claimed is:

1. An electrical panelboard including an enclosure having a bus assembly therein, a separable control unit removably received in said enclosure, means for latching said separable control unit in a fixed position in said enclosure, said latching means including cooperating portions on said separable control unit and in said enclosure respectively, a contact carriage mounted on and movable relative to said separable control unit, contact structure mounted on said carriage for movement between a first position in which the contact structure engages said bus assembly and a second position in which said contact structure is disengaged therefrom, means for moving said contact carriage relative to said separable control unit, means interconnecting said latching means and said contact carriage moving means to effect latching of the separable control unit in said fixed position with the contact structure disengaged from the bus assembly and to effect engagement of the contact structure with the bus assembly while the separable unit remains in its fixed position, and means coupled mechanically to said moving means for indicating the positions of said contact structure and of said latching means.

2. An electrical panelboard including an enclosure and a bus structure therein, a separable control unit removably received in said enclosure in a fully inserted position, a plug-in element mounted in said separable control unit for movement relative to the unit between a retracted position in which it is disengaged from said bus assembly and an extended position in which the plug-in element engages the bus assembly, means for moving said plug-in element from said retracted position to said extended position to thereby connect said plug-in element to said bus structure, latching means including a portion carried by said separable unit and a cooperating portion carried by said enclosure, said latching means being operable to secure said separable control unit in said fully inserted position, and means coupling said plug-in element and said latching means for operating said latching means in response to movements of said plug-in element so as to prevent relative movement of said separable control unit out of its fully inserted position so long as said plug-in element is in its extended position.

3. Electrical control apparatus including an enclosure and an assembly of power bus bars therein, a separable electrical control unit removably received in said enclosure, locking means including a portion on said separable control unit and a cooperating portion in said enclosure, said locking means being operable to lock said separable control unit in fixed position in said enclosure, plug-in means on said separable control unit for providing the power circuit of said separable control unit, said plug-in means being mounted on and movable relative to said separable control unit between projected and retracted positions, said plug-in means lateraly and forcibly engaging said bus bars in the projected position of the plug-in means and being disengaged therefrom in its retracted position, common actuating means in said separable control unit for operating said locking means and said plug-in means, in sequence, first locking said separable control unit in said enclosure, and then applying a thrust to said plug-in means and a reaction force to said locking means to drive the plug-in unit into its projected position in engagement with said bus bars and, in reverse sequence, applying a retracting thrust to said plug-in means and an opposite reaction force to said locking means to disengage said plug-in means from the bus bars before said separable control unit is unlocked from said enclosure.

4. Electrical control apparatus including an enclosure and a power bus structure therein, a separable electrical control unit removably received in said enclosure, a plug-in element in said separable control unit mounted for movement relative thereto between retracted and projected positions for engagement and disengagement with said bus structure, cooperating means in said enclosure and in said separable control unit for locking said control unit in said enclosure, and common actuating means in said separable control unit for operating said locking means and thereby locking said control unit in said enclosure and thereafter operating said plug-in element into its projected position in engagement with said bus structure of the enclosure.

5. Electrical control apparatus including an enclosure and a bus structure within said enclosure, a separable control unit removably received in said enclosure, a plug-in element carried by said separable control unit and movable relative thereto between retracted and projected positions, said bus structure being engaged by said plug-in element in the projected position thereof when the control unit is in its fully inserted position in the enclosure, and cooperable means in said enclosure and in said separable control unit effective upon limited insertion of said separable unit into said enclosure to obstruct said separable control unit against full insertion into said enclosure when said plug-in element is in its projected position relative to said separable unit.

6. Electrical control apparatus including an enclosure and a power bus structure therein, said enclosure having an opening and a cover for said opening, a separable electrical control unit removably received in said enclosure through said opening, said separable control unit having electrical contact means operable between a "make" position and "break" position for providing the power circuit of the control unit, an indicator coordinated with said electrical contact means and operable between a retracted position within said enclosure when said electrical contact means is in one of said positions and operable to a projected position beyond said enclosure when said electrical contact means is in the other of said positions, said indicator including a resilient mounting enabling it to be forced into its retracted position by closing of said cover.

7. Electrical control apparatus including an enclosure and a power bus structure therein, said enclosure having an opening and a cover for said opening, a separable electrical control unit removably received in said enclosure and insertable therein through said opening for cooperation with said bus structure, said enclosure and said separable control unit having cooperable means for locking the latter in its inserted position, said separable control unit having electrical contact means operable between "make" and "break" positions for providing for interrupting the power circuit of the control unit, said locking means and said electrical contact means having coordinated operating means, and an indicator resiliently coupled to said coordinating means, said indicator being movable between the retracted position within said separable control unit to plural indicating positions representing the different combinations of said locking means and said electrical contact means and including a position projected outside of said enclosure, said resilient means enabling closing of said cover against said indicator in its projected position, the indicator thereby being moved to a retracted position within the enclosure.

8. Electrical distribution apparatus including a separable connector unit, a movable plug-in element carried thereby and operable between retracted and projected positions, an enclosure, and a bus assembly in said enclosure, said separable connector unit being mechanically connectable to said enclosure, said bus structure being engageable by said plug-in element in the projected position thereof when said unit is mechanically connected to said enclosure, and cooperable means forming part of said enclosure and said separable connector unit to obstruct connection of the connector unit to the enclosure when said plug-in element is in its projected position relative to said unit.

9. Electrical control apparatus including an enclosure and a power bus structure therein, a separable electrical control unit removably received in said enclosure, a plug-in element in said separable control unit and mounted for movement relative to said unit between retracted and projected positions for engagement and disengagement with said bus structure, cooperating means in said enclosure and in said separable control unit for locking said control unit in said enclosure including latch members mounted in said control unit, cam means mounted on said plug-in element and operatively connected to said latch members, and means in said separable control unit for moving said plug-in element and said cam means and thereby locking said control unit in said enclosure and thereafter operating said plug-in element into its projected position in engagement with said bus structure of said enclosure.

10. Electrical control apparatus including an enclosure and a power bus therein, a separable electrical control unit removably received in said enclosure, a plug-in element in said separable control unit, said plug-in element being mounted for movement relative to said separable control unit between retracted and projected positions for engagement with and disengagement from said bus structure, cooperating means including respective portions in said enclosure and in said separable control unit for locking said control unit in said enclosure, actuating and coordinating means operatively connecting said plug-in element and the portion of said cooperating means in said separable control unit for sequentially locking said separable control unit in said enclosure and thereafter moving said plug-in element into its projected position in engagement with said bus structure in said enclosure.

References Cited by the Examiner

UNITED STATES PATENTS

| 2,254,920 | 9/41  | Smith et al. _____ 317—99 |
| 2,615,101 | 10/52 | Caswell _____ 200—50 |
| 2,719,251 | 9/55  | Stewart _____ 317—120 |
| 2,777,024 | 1/57  | West _____ 200—50 |
| 2,921,998 | 1/60  | Pokorny et al. _____ 317—103 X |
| 3,066,244 | 11/62 | Defandorf et al. _____ 317—120 |

JOHN F. BURNS, *Primary Examiner*.